Dec. 14, 1926.  
J. JACOBEY  
1,610,381  
HACK SAW  
Original Filed March 17, 1923  2 Sheets-Sheet 1

John Jacobey
Inventor

By  *C. W. Harpman*  Attorney

Dec. 14, 1926.                                                    1,610,381
                          J. JACOBEY
                           HACK SAW
              Original Filed March 17, 1923    2 Sheets-Sheet 2
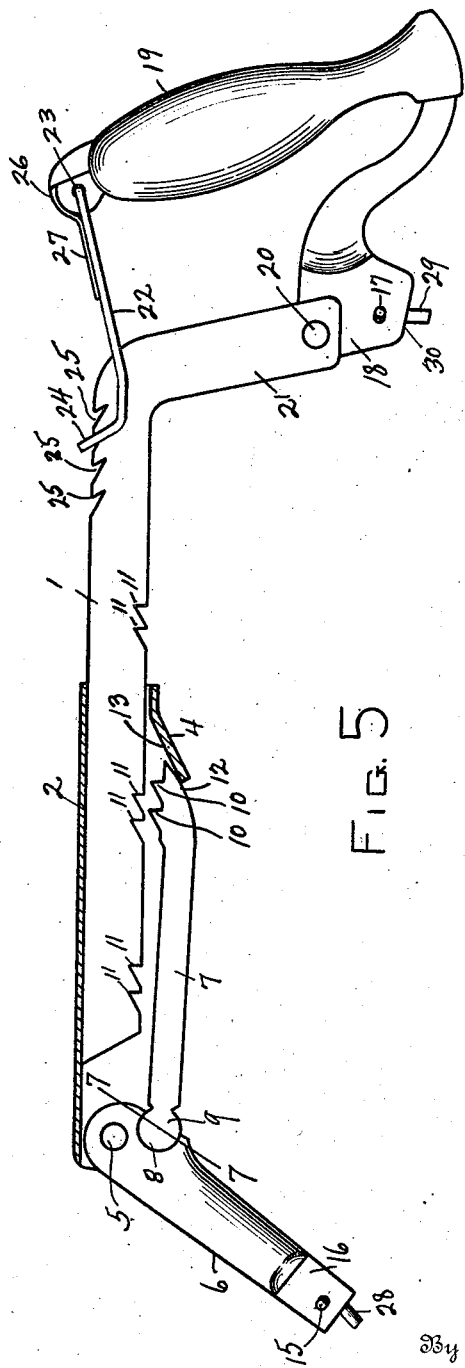
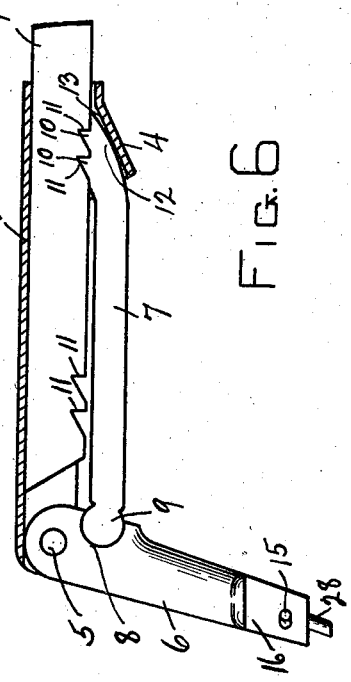
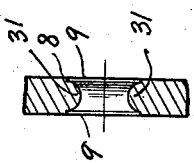
JOHN JACOBEY
    Inventor
By
        Attorney Patented Dec. 14, 1926.

UNITED STATES PATENT OFFICE.

JOHN JACOBEY, OF EAST YOUNGSTOWN, OHIO.

HACK SAW.

Application filed March 17, 1923, Serial No. 625,713. Renewed November 1, 1926.

This invention relates to improvements in hack saws.

The main objects of this invention are to provide an adjustment frame portion, said adjustment being made by means of a telescope of adjusting means forming the back portion of said frame. This adjustment is provided with a locking means consisting of a dog pivotally positioned downward and of the hack saw frame, the other end of said dog provided with a plurality of teeth for engagement with a plurality of notches formed on a lower side of the main back portion of the hack saw frame. The inner dog end being forced into contact with the upper teeth of the frame by means of an incline casing member.

A still further object of the invention is to provide a handle structure pivotally secured to the inner down turned end of the main back portion of the frame of said saw. The upper end of said handle being provided with a spring controlled latching means for tightening the hack saw blade when placing either in a horizontal or vertical position on the hack saw frame.

A still further object is the providing of a dual manner in attaching the hack saw blade to the hack saw frame and connect parts in such a way that it is not necessary to use thumb screws, nuts or the like, for securing said blade.

Further objects and objects relating to structural details will definitely appear from the detailed description to follow.

I accomplished the object of my invention by the devices and means described in the following specification. The invention is clearly defined and pointed out in the claim.

A structure, which is a preferred embodiment of my invention, is clearly illustrated in the accompanying drawings forming a part of this specification, in which:

Figure 5 is a side elevation of the hack saw blade removed, and one part of the telescopic frame portion in cross section, in order to show the means of adjusting said frame.

Figure 6 is a detailed view showing a portion of Figure 5 wherein the securing means are in contact.

Figure 7 is a cross section on line 7—7 of Figure 5.

Figure 1:
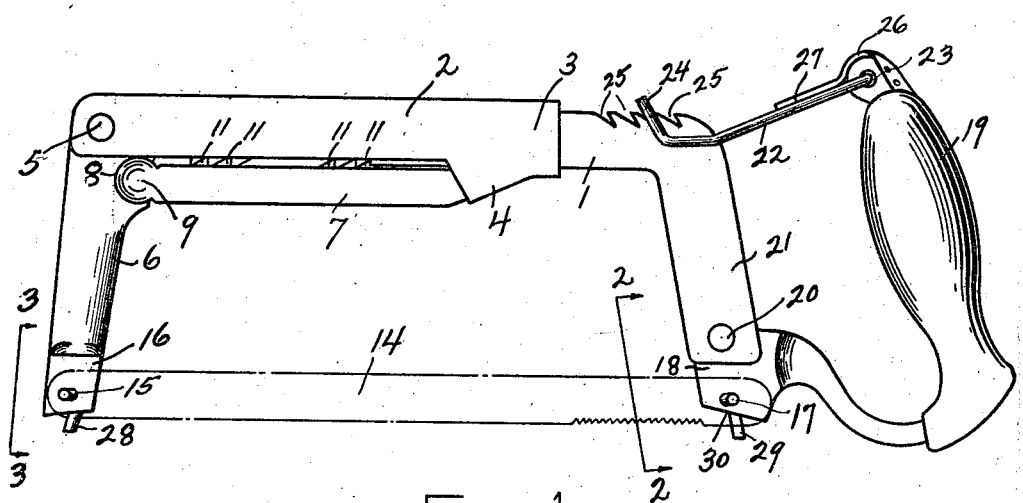
Figure 1 is a side elevation of my improved hack saw.
Figure 4:
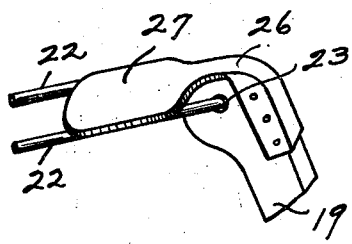
Figure 4 is a detailed perspective view of the upper portion of handle, showing spring controlled latching means.
Figure 3:
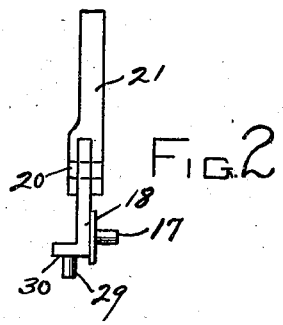
Figure 3 is a detailed portion of Figure 1 as indicated by the line 3—3.
Figure 2:
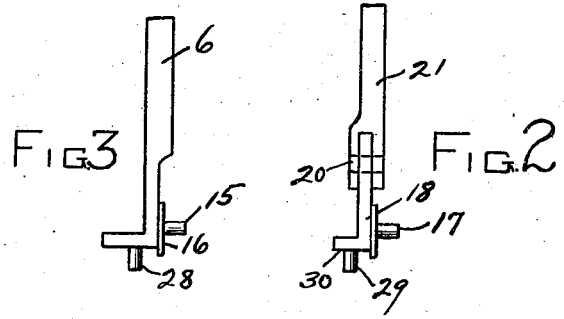
Figure 2 is a detailed portion of Figure 1 as indicated by line 2—2.

By referring to Figure 1 it will be seen that I have provided a hack saw frame consisting of two principal members. Member 1 is telescoped within a second member 2. This second member 2 is provided with a casing end 3 having an inclined bottom portion 4. The member 2 is provided with a pivot 5 for securing of a down turned outer member 6 of the frame proper. This down turned outer member 6 is provided with a pivotally secured dog 7 secured in the down turned outer member 6 at point 8.

By referring to Figure 7 it will be seen that this securing means is secured by means of enlarged ends 9 functioning over the inner ridge 31 of the opening at point 8.

By referring to Figure 5 it will be seen that when it is desired to adjust the frame, the down turned outer member 6 is swung outwardly on the pivot 5, thereby drawing dog 7, carrying the teeth 10 from the engagement with the notches 11 formed on the under edge of the frame member 1. This dog 7 is provided with an upcurved surface 12 which engages with the inner inclined surface 13 of the inclined bottom portion 4.

By referring to Figure 6 it will be seen that when the frame members 1 and 2 are telescoped to a desired position, the frame parts 1 and 2 are made secure by pressing inwardly upon the down turned outer member 6, thereby forcing the teeth 10 of the dog 7 to engage in the notches 11 and rigidly securing the above mentioned members by contact of the curved portion 12 of the dog 7 against the inner inclined surface 13 of the inclined bottom portion 4. The saw blade 14 as indicated in Figure 1 may now be positioned upon the outwardly extending lug 15 formed on the surface 16 of the down turned outer member 6. This lug 15 is turned outwardly slightly less than ninety degrees in order that the blade will be caused to press down snugly against the surface 16 when the blade is placed under tension, the manner of which will be described hereinafter. The other end of the blade is secured to a lug 17 which is formed upon the side surface 18 in an inclined manner as shown and described for lug 15. In order to tighten the blade, the operator may press the handle 19, thereby causing the handle 19 to swing upon the pivot 20 which secures the lower end 21 of the frame portion 1 to the handle 19. The upper portion of the handle 19 is provided with a latch arm 22 which passes through an opening 23 of the upper portion of the handle 19. This latching portion is provided with an upturned latching end 24, provided with an engaging means for the engagement with notches 25 formed on the upper portion of the frame member 1. In order that the latching arm 22 may be held in tension in relation to the notches 25, a spring 26 is secured to the upper end of the handle 19 in such a manner and form as to also provide a thumb rest 27, in which, when it is desired to place the blade in a horizontal position in relation to the frame, the blade is positioned upon an outer lug 28 of the down turned outer member 6 and a lug 29 on the bottom portion of the handle portion 19 at point 30.

What I claim is:—

An extensible saw frame comprising one frame member telescoping within a second casing member, a casing formed upon the inner end of one of said frame members, an inclined bottom portion of said casing; a plurality of notches formed upon the under side of the frame member telescoping within the casing member, a downwardly projecting member pivotally secured to said casing member, a dog pivotally secured to said downwardly projecting member, said dog provided with a plurality of teeth upon an upcurved end portion of said dog.

In testimony whereof I affix my signature.

JOHN JACOBEY.